US008167573B2

(12) United States Patent
Merrill et al.

(10) Patent No.: US 8,167,573 B2

(45) Date of Patent: May 1, 2012

(54) GAS TURBINE AIRFOIL

(75) Inventors: Gary B. Merrill, Orlando, FL (US); Douglas A. Keller, Kalamazoo, MI (US)

(73) Assignee: Siemens Energy, Inc., Orlando, FL (US)

( * ) Notice: Subject to any disclaimer, the term of this patent is extended or adjusted under 35 U.S.C. 154(b) by 848 days.

(21) Appl. No.: 12/233,878

(22) Filed: Sep. 19, 2008

(65) Prior Publication Data

US 2010/0074726 A1 Mar. 25, 2010

(51) Int. Cl.

| | |
|---|---|
| ***B63H 1/26*** | (2006.01) |
| ***B63H 7/02*** | (2006.01) |
| ***B64C 11/16*** | (2006.01) |
| ***B64C 27/46*** | (2006.01) |
| ***F01D 5/14*** | (2006.01) |
| ***F03B 7/00*** | (2006.01) |
| ***F03D 11/02*** | (2006.01) |
| ***F04D 29/38*** | (2006.01) |

(52) U.S. Cl. ................ 416/229 A; 416/224; 416/227 R; 416/241 A; 416/241 B

(58) Field of Classification Search .............. 416/229 A, 416/227 R, 241 B See application file for complete search history.

(56) References Cited

U.S. PATENT DOCUMENTS

| | | | | |
|---|---|---|---|---|
| 4,639,388 | A | 1/1987 | Ainsworth et al. | |
| 5,419,971 | A | 5/1995 | Skelly et al. | |
| 5,616,001 | A | 4/1997 | Boyd | |
| 5,720,597 | A | 2/1998 | Wang et al. | |
| 6,013,592 | A | 1/2000 | Merrill et al. | |
| 6,074,706 | A | 6/2000 | Beverley et al. | |
| 6,106,231 | A | 8/2000 | Brainch et al. | |
| 6,135,715 | A | 10/2000 | Correia | |
| 6,200,092 | B1 | 3/2001 | Koschier | |
| 6,235,370 | B1 | 5/2001 | Merrill et al. | |
| 6,241,469 | B1 * | 6/2001 | Beeck et al. | 415/115 |
| 6,451,416 | B1 | 9/2002 | Holowczak et al. | |
| 6,575,702 | B2 | 6/2003 | Jackson et al. | |
| 6,641,907 | B1 | 11/2003 | Merrill et al. | |
| 6,709,230 | B2 | 3/2004 | Morrison et al. | |
| 6,846,574 | B2 | 1/2005 | Subramanian | |
| 7,011,502 | B2 | 3/2006 | Lee et al. | |
| 2002/0172799 | A1 * | 11/2002 | Subramanian | 428/116 |
| 2003/0223861 | A1 * | 12/2003 | Morrison et al. | 415/115 |
| 2008/0178465 | A1 * | 7/2008 | Schiavo et al. | 29/889.21 |
| 2008/0203236 | A1 * | 8/2008 | Mazzola et al. | 244/35 R |

* cited by examiner

*Primary Examiner* — Michael S. Lebentritt
*Assistant Examiner* — Valerie N Brown

(57) ABSTRACT

A gas turbine airfoil (20) having a load-bearing core (30). A honeycomb structure (40A, 42A) is attached to pressure and/or suction sides (22, 24) of the core and is filled with ceramic insulation (50). A ceramic matrix composite boot (60A, 60B, 60C) may cover the leading edge (26) of the core. Edges (61, 62) of the boot may be attached to the core by rows of pins (63A, 63B) or by flanges (65) inserted in slots (69) in the core. The pins may be formed in place by forming pin holes (64) in the boot, clamping the boot onto the core, filling the pin holes with metal or ceramic and metal particles, and heating the particles for internal cohesion and solid-state diffusion bonding (66) with the core. The boot may have a central portion (71) that is not bonded to the core to allow differential thermal expansion.

20 Claims, 5 Drawing Sheets

FIG 3
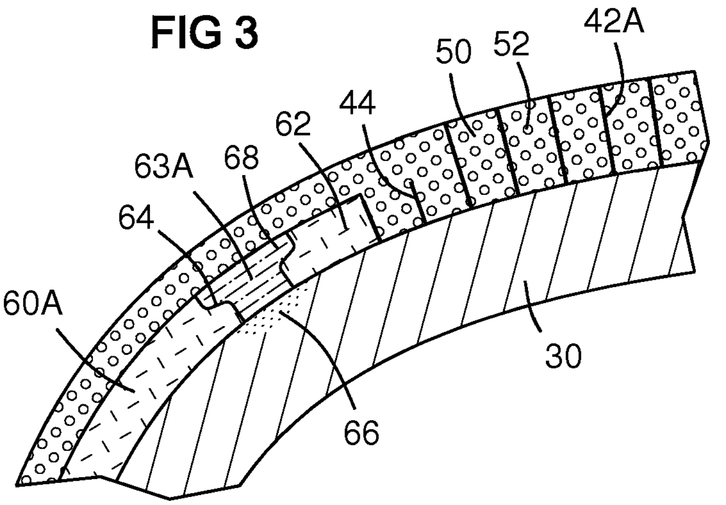
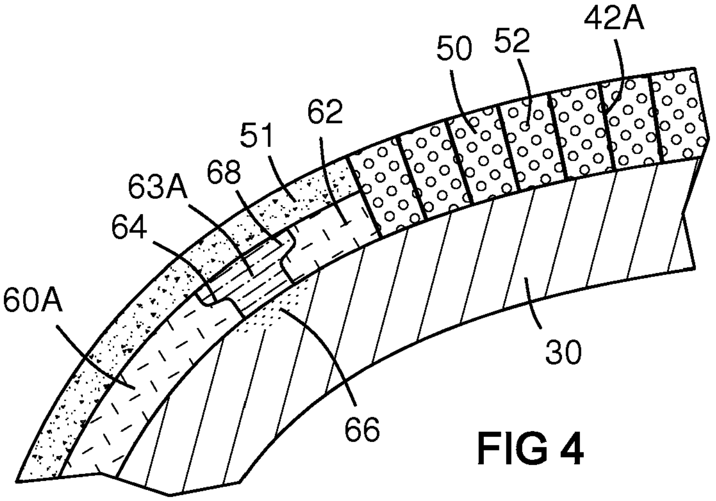
FIG 4
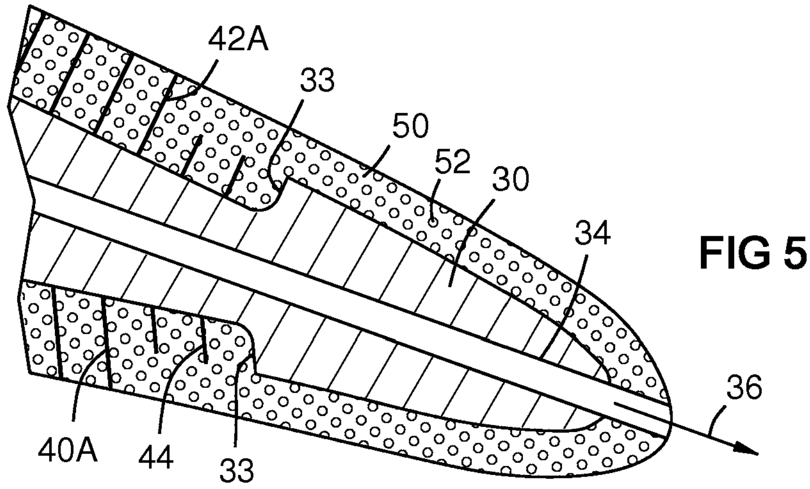
FIG 5

GAS TURBINE AIRFOIL

FIELD OF THE INVENTION

This invention relates to airfoils in high-temperature environments, and particularly to thermal barrier coatings on vanes and blades in the turbine section of a gas turbine engine.

BACKGROUND OF THE INVENTION

Airfoils in high-temperature environments, such as vanes and blades in the hottest rows of a gas turbine, require thermal protection and cooling. Thermal barrier coatings (TBCs) are used to reduce heat flux into the airfoil and allow hotter surface temperatures on the airfoil. Currently, TBCs can only be applied as thin layers, since thermal gradients cause differential expansion within the coating and between the coating and substrate, which weakens the coating and its adhesion to the substrate. However, a thin TBC means that a substantial amount of air or steam cooling of the component is needed to maintain temperature limits of the substrate.

One technology to increase TBC thickness while maintaining its integrity and adhesion is called a back-filled honeycomb. This is a metallic honeycomb attached to a metal substrate surface and filled with a ceramic thermal barrier material. Examples of this technology are found in U.S. Pat. Nos. 6,846,574; 6,641,907; 6,235,370; and 6,013,592. A prefabricated honeycomb structure can be welded to a substrate. Alternately, a honeycomb may be fabricated by depositing a metal-ceramic material in a mask on the substrate and heating it to produce cohesion and a solid-state diffusion bond with the substrate. Back-filled honeycomb technology provides a metal-to-ceramic friendly bond, and allows thicker thermal barrier coatings.

A prefabricated honeycomb structure is useful for relatively flat surfaces, but cannot be conveniently bonded to a curved surface, such as an airfoil surface. The honeycomb masking/deposition method as in U.S. Pat. No. 6,846,574 can be used on curved surfaces, but is difficult to apply on highly curved or sharp surfaces, such as the leading and trailing edges of an airfoil.

BRIEF DESCRIPTION OF THE DRAWINGS

The invention is explained in the following description in view of the drawings that show:

FIG. 3. is a detail view of a pin retaining the boot on the airfoil core.

FIG. 4. is a view as in FIG. 3 showing a variation in an outer coating on the CMC boot.

FIG. 5. is a detail view of the trailing edge of FIG. 1.

DETAILED DESCRIPTION OF THE INVENTION

Figure 1:
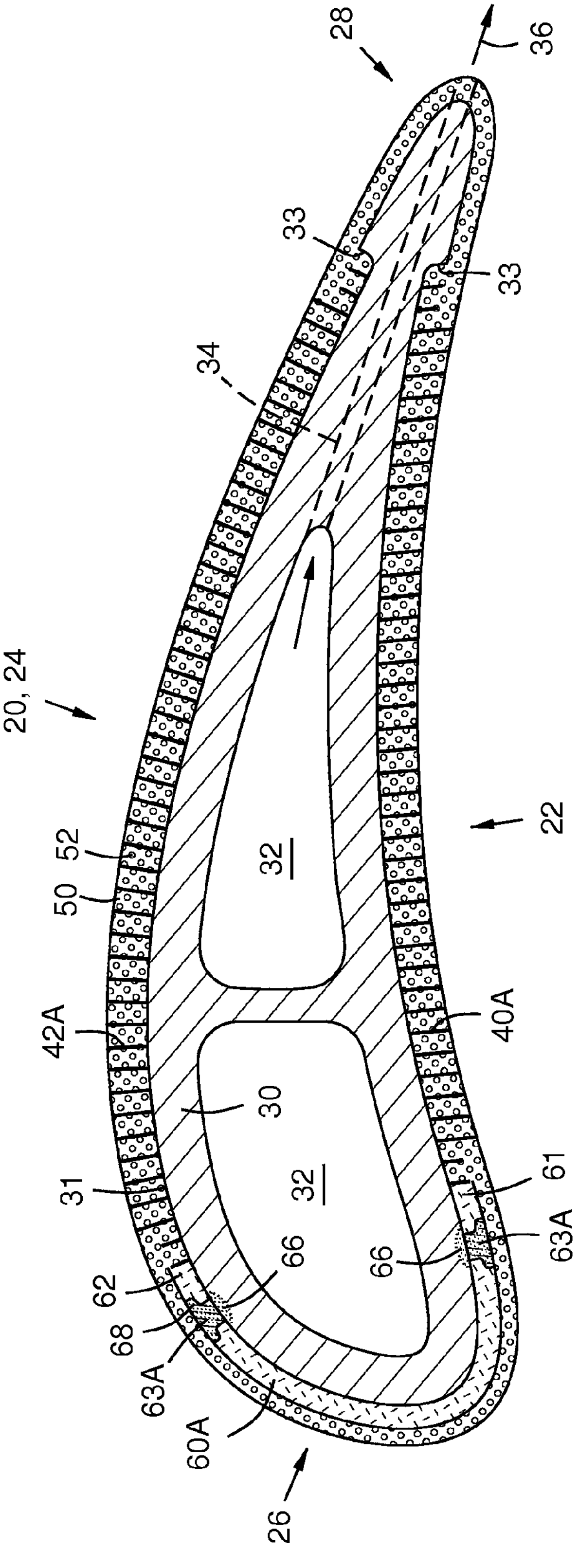
FIG. 1 is a transverse section of a turbine airfoil core with ceramic-filled honeycombs on the pressure and suction surfaces, and a leading-edge CMC boot according to aspects of the invention.

FIG. 1 shows a transverse section of an airfoil 20, such as a gas turbine blade or vane, with a pressure side 22, a suction side 24, a leading edge 26, a trailing edge 28, a metal or ceramic/metal load-bearing core 30, main cooling channels 32, a trailing edge cooling channel 34, and a trailing edge coolant flow 36. The airfoil 20 may have a substantially consistent sectional geometry along a length of the airfoil, or it may vary. For example the airfoil may taper from a first end to a second end. Turbine vanes commonly span between radially inner and outer platforms that form respective inner an outer shroud rings in the turbine. These aspects are known in the art in various forms.

A metallic or metallic/ceramic honeycomb 40A, 42A may be formed and bonded to the pressure and/or suction sides of the core 30 by a method as taught in U.S. Pat. No. 6,846,574 B2 of the present assignee, which is incorporated herein by reference. In summary, this involves depositing a masking material on a substrate, which in the present invention is a surface 31 of the airfoil core 30; then selectively removing portions of the mask, for example by photolithography or laser etching, to form a honeycomb void pattern in the mask material; then depositing a metal or a graded metal/ceramic particulate wall material into the honeycomb void pattern, for example by electro deposition; then heating the wall material to produce cohesion within the wall material and a solid-state diffusion bond between the wall material and the substrate. This forms a honeycomb wall structure bonded to the substrate. The remaining mask material is then removed to form a void pattern of cells within the honeycomb walls. An insulating ceramic particulate material 50 and a bonding agent are then deposited into the honeycomb cells, for example by electro-deposition, and is heated to produce cohesion within the insulating material and bonding to the honeycomb walls and substrate. The insulating material 50 may include hollow ceramic spheres 52 as also taught in U.S. Pat. No. 6,846,574 or other voids. Such voids provide insulation and abradability, which allows surface wear from particle impacts without deep spalling. Alternately, a metal or ceramic/metal honeycomb may be bonded to the substrate by brazing or welding.

Figure 2:
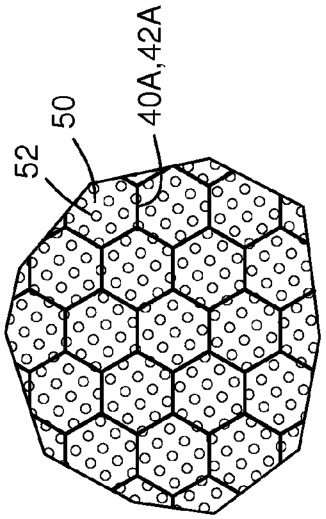
FIG. 2. is a detail surface view of the ceramic insulation-filled honeycomb.

The honeycomb walls can be formed at any angle to the substrate, depending on the direction of the etching process, for example the direction of a laser beam. Thus, the honeycomb walls 40A can be substantially parallel to each other as shown on the pressure side 22 of FIG. 1, or the walls 42A can be normal to the substrate surface as shown on the suction side 24 of FIG. 1. The honeycomb walls 40A, 42A can be applied to follow the curvatures of the pressure and suction sides of the airfoil in either a normal or a parallel honeycomb wall orientation, or combinations of these orientations and others as desired. The walls may be formed in any polygonal pattern that provides a generally uniform honeycomb wall thickness throughout the pattern, including, but not limited to, hexagonal, square, rectangular, and triangular cells. FIG. 2 shows a surface view of a hexagonal honeycomb wall structure 40A, 42A filled with ceramic insulation 50 containing hollow ceramic spheres 52.

On the highly curved leading edge of the airfoil, a honeycomb structure becomes less desirable, because the cell walls would be highly divergent or highly oblique to the substrate in some areas. Thus, according to the present invention, the leading edge 26 may be covered with a boot 60A of ceramic matrix composite (CMC) material formed of ceramic fibers in a ceramic matrix. The fibers may be random, oriented, or woven into a fabric as known in the art. The boot may have a C or U-shaped cross section as shown. First and second ends 61, 62 of the section define first and second edges of the boot.

FIG. 1 shows a CMC boot 60A attached to an airfoil core 30 with pins 63A having enlarged heads 68. FIG. 3 shows a detail of the pin attachment mechanism of this embodiment.

The pins 63A may be formed of a metal or metal/ceramic material bonded to the core 30 by solid-state diffusion bonding 66. This can be done by forming and curing the CMC boot 60A using fabrication methods known in the art, then forming respective pin-shaped holes 64 for the pins 63A in the CMC boot 60A by any machining method, such as milling or laser etching. The boot 60A may then be clamped against the leading edge of the core 30. The holes 64 now serve as molds for the pins, and may be filled with metal particles, or with a gradient mixture of metal and ceramic particles, with mostly or all metal particles at the bottom, and mostly or all ceramic particles in the head 68. The pin material may then be heated to a temperature of internal cohesion and solid-state diffusion bonding 66 with the substrate 30. The pin materials and heating may be the same as for the honeycomb walls 40A, 42A. This pin fabrication method forms a perfectly tight yet stress-free pin that is integrally bonded with the substrate. The remainder of the boot 60A between the edges 61, 62 may be unbonded to the substrate to allow limited slippage of the boot relative to the substrate during differential expansion. This aspect may be further developed to provide a cooling channel as later described for FIG. 7.

FIG. 3 shows that the ceramic insulation 50 of the honeycomb 42A may extend to cover the CMC boot 60A. The honeycomb 42A may have a substantially consistent height over most of the surface 31. However, one or more shorter rows of cells 44 may be provided adjacent the leading and/or trailing edges 26, 28 to anchor the insulation 50 beside the boot 60A and/or to anchor the insulation over the trailing edge.

FIG. 4 shows a detail as in FIG. 3 using a different ceramic insulation 51 covering the boot 60A than the insulation 50 on the honeycomb 42A. The insulation 51 may be optimized differently than the insulation 50 in the honeycomb to provide advantages such as increased adhesion to CMC and/or impact resistance. For example the insulation 51 may be a ceramic without voids but with an anisotropic crystal lattice structure for low thermal conductivity, such as taught in U.S. application Ser. No. 12/101,460 filed 11 Apr. 2008 and assigned to the present assignee, which is incorporated herein by reference.

FIG. 5 shows a detail of a trailing edge 28 with shoulders 33 formed in the core member 30. Each shoulder defines a transition between the respective pressure and/or suction side 22, 24 and the trailing edge 28 portion of the core. Each shoulder 33 defines a first thickness of the ceramic insulation 50 over the core member trailing edge 28 that is less than a second thickness of the ceramic insulation over the pressure and suction sides 22, 24 of the core 30.

Figure 6:
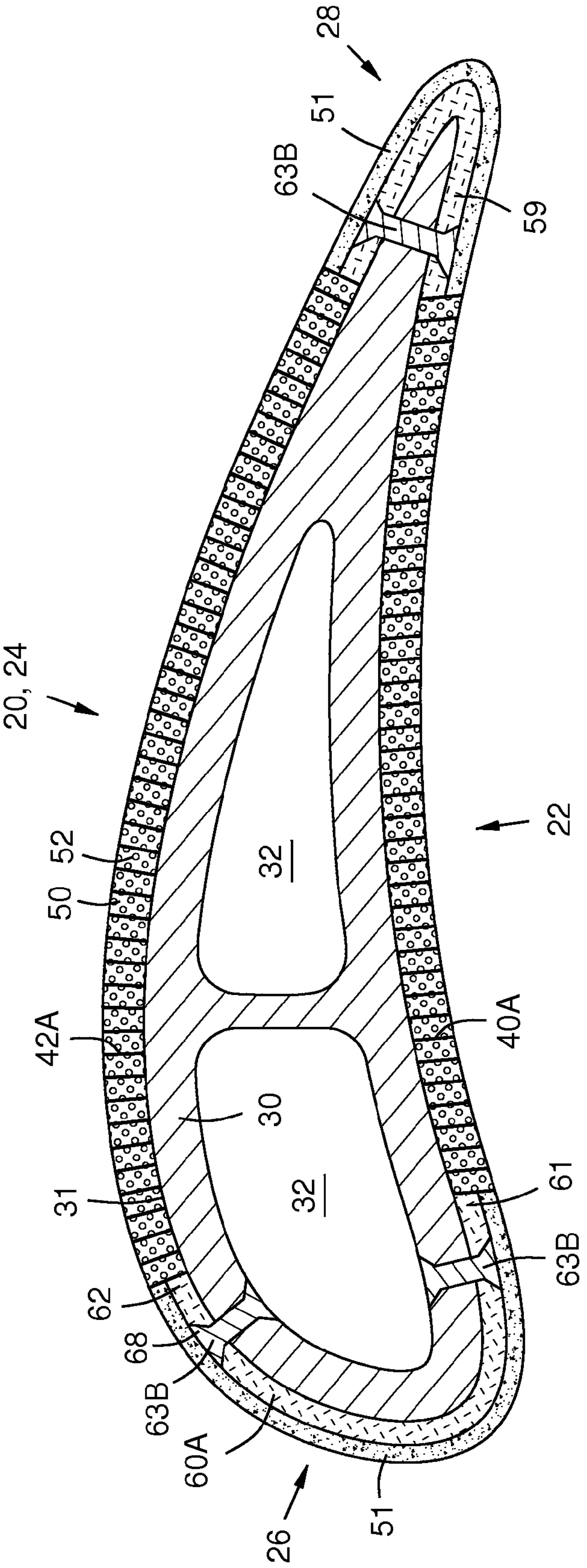
FIG. 6. is a view as in FIG. 1, showing an alternate pin embodiment.

FIG. 6 shows an embodiment 20 with both a leading edge CMC boot 60A and a trailing edge CMC boot 59, in which each boot is attached to the core 30 with metal pins or rivets 63B. These pins or rivets may have two heads as shown, formed by a riveting tool, or they may have only a distal head 68 in the boot and a cylindrical shaft pressed into a cylindrical bore in the core.

Figure 7:
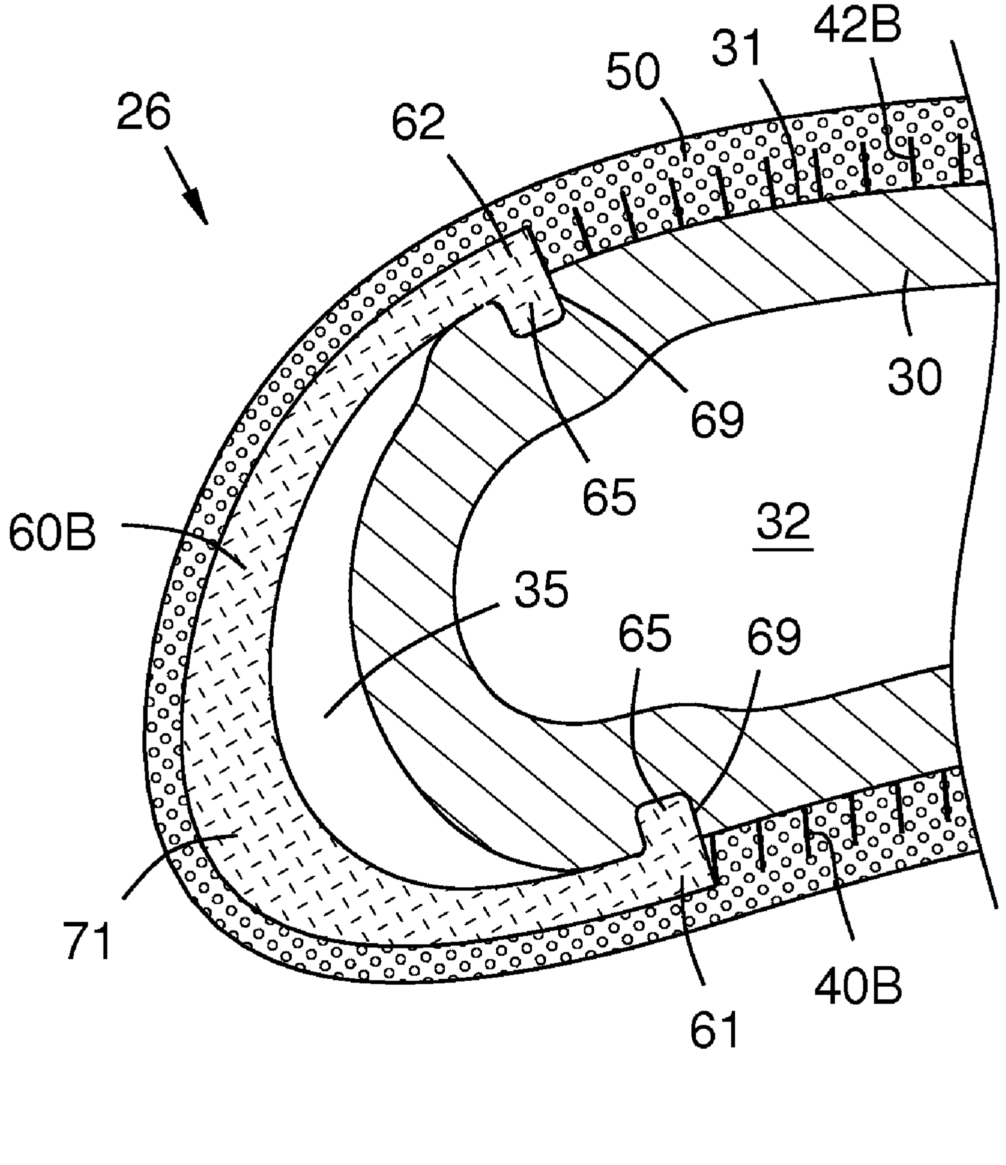
FIG. 7. is a detail view of another leading edge CMC boot embodiment.

FIG. 7 shows a CMC boot 60B with retention flanges 65 inserted into respective retention slots 69 in an airfoil core 30. The slots 69 can be formed by machining, casting, or extrusion of the core. This boot can be formed and cured, then elastically spread and clipped onto the core from ahead of the leading edge. Alternately the boot may be slid onto the core from one end of the airfoil. For example if a vane airfoil has a removable inner or outer platform, the boot 60B can be slid onto the core 30 from an end of the airfoil. Optionally, a gap 35 may be provided between the core and the boot. This may serve as a cooling channel, and also allows differential expansion of the boot 60B relative to the core 30. A central portion 71 of the boot may be thicker than the boot edges 61, 62, for impact resistance. This variation in thickness may be achieved by increasing layers of ceramic fabric or fibers toward the center 71, or by a ceramic inclusion in the middle of the boot (not shown). A TBC 50 may be applied over the boot. This TBC may be either continuous over the boot and the honeycomb, or it may be discontinuous at the boot/honeycomb interface. This boot is replaceable by cutting away the TBC along the edges 61, 62 of the boot, and tapping/sliding the boot off an end of the airfoil or by cutting through the middle of the boot and removing it from the slots 69 in halves. FIG. 7 also illustrates an embodiment of a honeycomb 40B, 42B that extends only part-way to the surface of the TBC 50.

Figure 8:
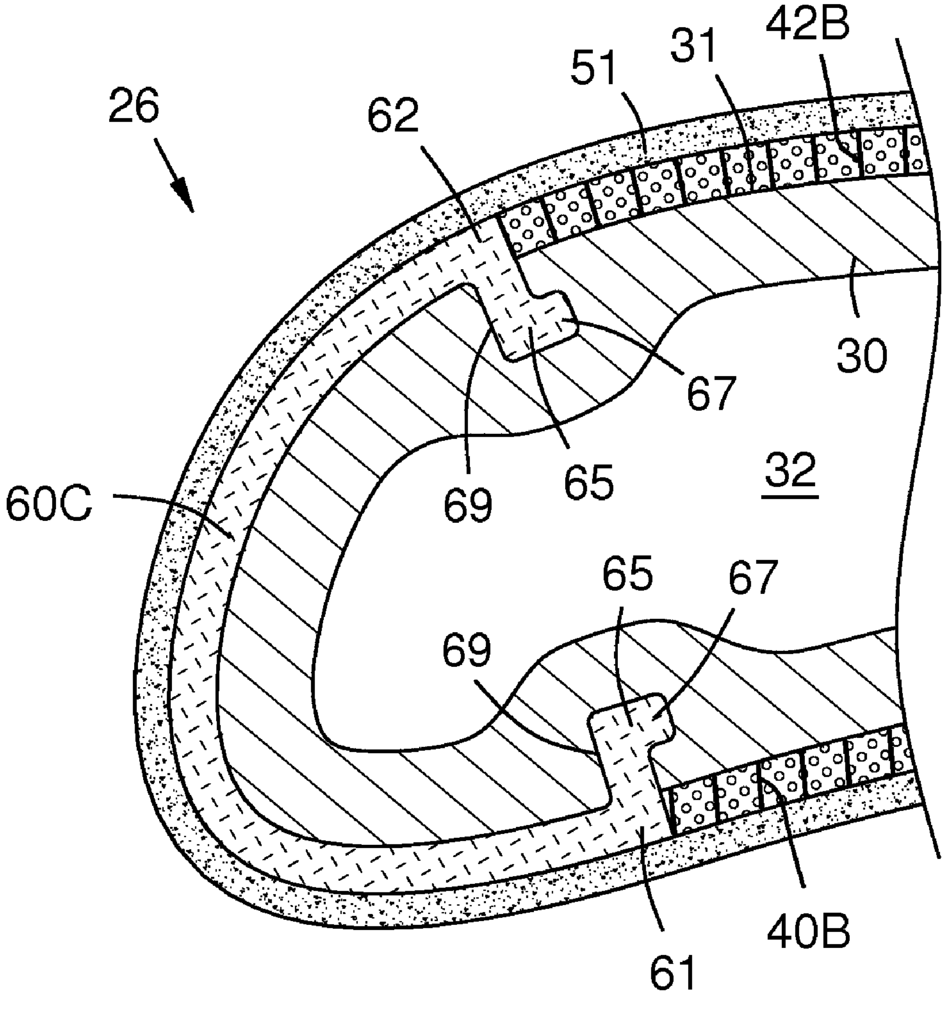
FIG. 8. is a detail view of another leading edge CMC boot embodiment.

FIG. 8 shows a CMC boot 60C with hooked retainer flanges 65 in retention slots 69 in an airfoil core 30. A hook 67 on each flange positively prevents slippage of the flange out the retention slot 69 normal to the surface of the core member. To fabricate this embodiment, the slots 69 can be formed by extruding the core or by including a fugitive material in casting the core. Then the boot can be slid onto the core from one end of the airfoil. Alternately, the boot 60C can be formed and fully cured, then inserted into a mold. Then material for the core can be poured into the mold, imbedding the flange 65 and hook 67 in the core. With the latter method, the boot cannot be removed and replaced, but the TBC 51 on the boot can be replaced by etching or machining away the old TBC and applying a new one.

While various embodiments of the present invention have been shown and described herein, it will be obvious that such embodiments are provided by way of example only. Numerous variations, changes and substitutions may be made without departing from the invention herein. Accordingly, it is intended that the invention be limited only by the spirit and scope of the appended claims.

The invention claimed is:

1. An airfoil for use in a gas turbine engine, the airfoil comprising:

a load-bearing core member extending from a leading edge portion to a trailing edge portion, and comprising a surface with a pressure side and a suction side;

a honeycomb structure attached to the pressure side and/or the suction side of the core member, and defining a plurality of outwardly opening cells;

a first ceramic insulation material filling the cells of the honeycomb structure; and a ceramic matrix composite leading edge boot attached to the core member leading edge.

2. The airfoil of claim 1, wherein the first ceramic insulation material extends to cover the boot, and the first ceramic insulation material comprises an outer surface defining an airfoil shape.

3. The airfoil of claim 2, further comprising:

a ceramic matrix composite trailing edge boot attached to the core member trailing edge; and the first ceramic insulation material disposed over the ceramic matrix composite trailing edge boot.

4. The airfoil of claim 1, further comprising a second ceramic insulation material that covers the boot, and the first and second ceramic insulation materials comprise outer surfaces that together define an airfoil shape.

5. The airfoil of claim 1, further comprising a shoulder formed in the core member defining a transition between the pressure and/or suction sides and the trailing edge portion, the shoulder defining a first thickness of the first ceramic insulation material over the core member trailing edge portion that is less than a second thickness of the first ceramic insulation over the pressure and suction sides of the core member.

6. The airfoil of claim 1, wherein the leading edge boot comprises a generally C or U-shaped cross section, wherein two ends of the cross section define first and second edges of the leading edge boot, and the leading edge boot is attached to the core member along the first and second edges of the leading edge boot.

7. The airfoil of claim 6, wherein the leading edge boot is not bonded to the core member between the first and second edges of the leading edge boot, enabling limited movement of a central portion of the leading edge boot relative to the core member to allow for differential thermal expansion.

8. The airfoil of claim 7, wherein the central portion of the leading edge boot is spaced from the leading edge of the core member, forming a cooling channel between the leading edge of the core member and the leading edge boot.

9. The airfoil of claim 6, wherein the first and second edges of the leading edge boot are attached to the core member by metallic/ceramic pins with enlarged heads, wherein the pins comprise a graded material that varies from mostly metal at the surface of the core member to all or mostly ceramic at the heads of the pins, and the pins are bonded to the core member by solid-state diffusion.

10. The airfoil of claim 6, wherein the first and second edges of the leading edge boot are attached to the core member by pins with enlarged heads, wherein the pins are formed by depositing a pin material comprising metal and ceramic particles into pin-shaped holes in the leading edge boot, and heating the pin material to a temperature of internal cohesion and solid-state diffusion bonding of the pin material with the core member.

11. The airfoil of claim 10, wherein the pin material comprises a graded metal/ceramic composition with proportionately more metal at the surface of the core member than at the head of the pin and proportionately more ceramic at the head of the pin than at the surface of the core member.

12. The airfoil of claim 6, wherein the first and second edges of the leading edge boot each comprise a retainer flange that extends into a respective retention slot in the surface of the core member, thus retaining the leading edge boot on the core member.

13. The airfoil of claim 12, wherein the retainer flange is slidable in the retention slot from an end of the airfoil.

14. The airfoil of claim 12, wherein the retainer flange further comprises a hook portion within the core member that prevents the retainer flange from slipping out of the retention slot in a direction generally normal to the surface of the core member.

15. An airfoil for use in a gas turbine engine, the airfoil comprising:

a load-bearing core member extending from a leading edge portion to a trailing edge portion, and comprising a surface with a pressure side and a suction side;

a respective honeycomb structure attached to the pressure side and/or to the suction side of the core member, and defining a plurality of outwardly opening cells;

a first ceramic insulation material filling the cells of the respective honeycomb structure;

a ceramic matrix composite leading edge boot comprising a generally C or U-shaped cross section, wherein two ends of the cross section define first and second edges of the leading edge boot, the leading edge boot is attached to the core along the first and second edges of the leading edge boot, and is not bonded to the core between the first and second edges of the leading edge boot; and a shoulder formed in the core member that defines a transition between the pressure and/or suction sides and the trailing edge portion, the shoulder defining a first thickness of the ceramic insulation material over the core trailing edge portion that is less than a second thickness of the ceramic insulation on the pressure and/or suction sides of the core member.

16. An airfoil for use in a gas turbine engine, the airfoil comprising:

a load-bearing core member extending from a leading edge portion to a trailing edge portion, and comprising a surface with a pressure side and a suction side;

a respective honeycomb structure attached to the pressure side and/or the suction side of the core member, and defining a plurality of outwardly opening cells;

a ceramic insulation material filling the cells of the respective honeycomb structure;

a ceramic matrix composite leading edge boot attached to the core member leading edge portion;

a ceramic matrix composite trailing edge boot attached to the core member trailing edge portion;

wherein the ceramic insulation material extends to cover the boots, the ceramic insulation material comprises an outer surface defining an airfoil shape; and wherein the respective honeycomb structure comprises short cells adjacent the leading and/or trailing edges of the core member, the short cells being shorter than most other cells of the respective honeycomb structure.

17. The airfoil of claim 16, wherein the leading edge boot comprises a generally C or U-shaped cross section, wherein two ends of the section define first and second edges of the leading edge boot, and the leading edge boot is attached to the core member along the first and second edges of the leading edge boot.

18. The airfoil of claim 17, wherein the leading edge boot is not bonded to the core member between the first and second edges of the leading edge boot, enabling relative movement between a central portion of the leading edge boot and the core member to allow for differential thermal expansion.

19. The airfoil of claim 18, further comprising a cooling channel between the leading edge portion of the core member and the central portion of the leading edge boot.

20. The airfoil of claim 17, wherein the first and second edges of the leading edge boot are attached to the core member by metallic/ceramic pins with enlarged heads, wherein the pins comprise a graded material that varies in composition from mostly or all metal at the surface of the core member to all or mostly ceramic at the heads of the pins, and the pins are bonded to the core member by solid-state diffusion.

* * * * *